United States Patent [19]

Cook, Jr.

[11] 4,230,996
[45] Oct. 28, 1980

[54] NOZZLE ARRAY FOR CHEMICAL LASERS

[75] Inventor: Curtis H. Cook, Jr., Palm Beach Gardens, Fla.

[73] Assignee: United Technologies Corporation, Hartford, Conn.

[21] Appl. No.: 970,949

[22] Filed: Dec. 19, 1978

[51] Int. Cl.³ .............................................. H01S 3/02
[52] U.S. Cl. ................................. 331/94.5 D; 239/555
[58] Field of Search ................... 331/94.5 D, 94.5 G, 331/94.5 T; 239/265.11, 555, 556

[56] References Cited

U.S. PATENT DOCUMENTS

| 3,602,432 | 8/1971 | Mulready | 239/265.11 |
| 3,819,321 | 6/1974 | Witt | 239/555 |
| 4,161,285 | 7/1979 | Matheny et al. | 239/555 |

Primary Examiner—James W. Davie
Attorney, Agent, or Firm—Lawrence A. Cavanaugh

[57] ABSTRACT

An improved nozzle array adapted for use in chemical lasers is disclosed. The sidewalls of the nozzle array include a restoring bar fixedly attached thereto adapted for elastically restoring plastic thermal deformation of the array. The nozzle array includes a plurality of nozzle manifolds disposed along the length of the array with relief slots disposed between each of the nozzle manifolds. Rigid support walls of the laser housing constrain thermal deformation of the array in the lengthwise direction while the array is adapted for unrestrained thermal expansion in the spanwise direction thereby minimizing corner shear strains resulting from thermal deformation during the operation of the laser.

6 Claims, 6 Drawing Figures

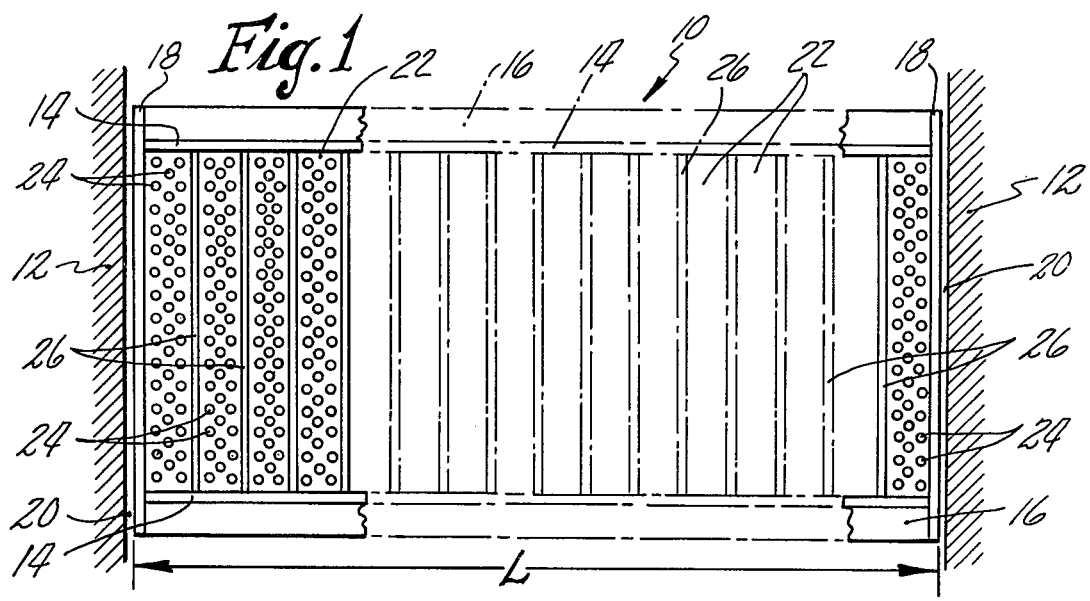
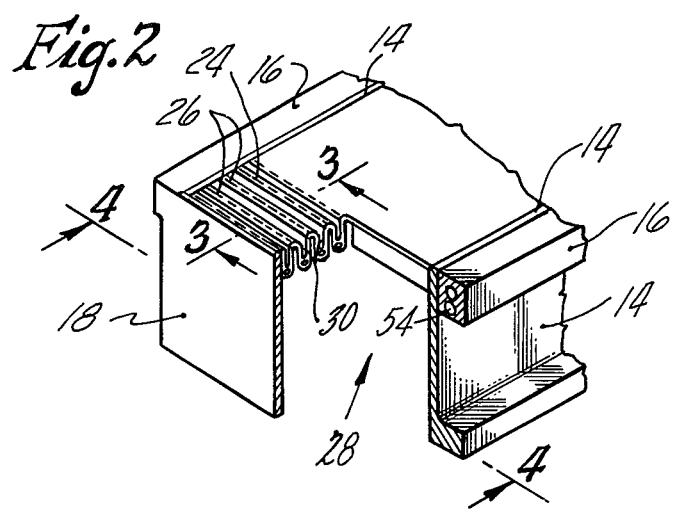
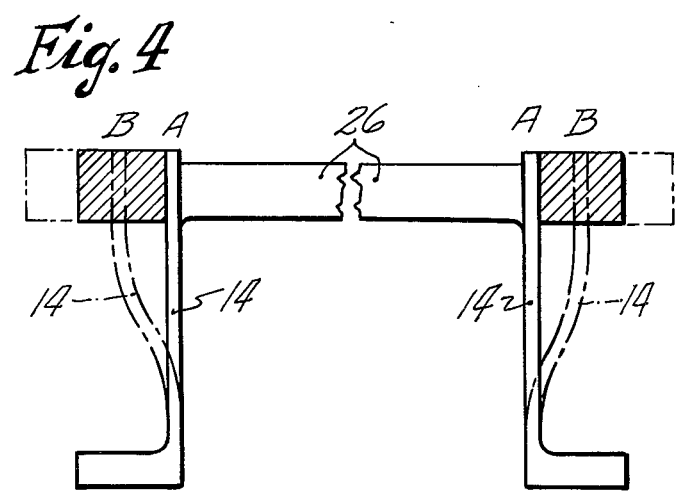

NOZZLE ARRAY FOR CHEMICAL LASERS

BACKGROUND OF THE INVENTION

The invention herein described was made in the course of or under a contract or subcontract thereunder with the Department of the Army.

This invention relates to nozzles and more particularly to a nozzle array having a minimum constraint support configuration adapted for minimizing corner shear strains resulting from thermal deformation of the nozzle array and for providing an elastic restoring force to a plastically deformed nozzle array.

In the operation of high powered chemical lasers a population inversion within an optical cavity region of the laser is created by expanding hot gases through a nozzle array by means well known in the art. The passage of hot gases, typically having a gas temperature in excess of four thousand degrees Rankine (4000° R.), through the nozzle significantly increases the temperature of the nozzle producing thermal distortion therein. In chemical lasers employing harsh gases such as fluorine, the nozzle must be constructed of material compatible with the harsh gas environment and the nozzle must maintain its structural integrity during repeated operation cycles. Nozzles constructed of pure nickel material are compatible for use with the harsh environment of fluorine gas. However, at the operating temperatures required of chemical lasers, the nickel nozzles undergo plastic thermal deformation resulting in unwanted distortions which are not restored during the cool-down portion of the operation cycle. The utilization of nickel material for the nozzle results in thermal strains being generated therein which seriously limit the fatigue lifetime of the nozzle structure.

The extremes in the gas temperatures combined with the reactive nature of the fluorine environment generally prohibits the use of sliding joints, seals, etc., typically utilized for compensating thermal distortion. Typically thermal expansion of a restrained nozzle array formed of nickel material results in unacceptably high plastic strains in the individual nickel nozzle elements, and results in excessive deflection of the nozzle array into the optical cavity, both of which have a deleterious effect on laser performance. Moreover, if the thermal expansion of a nozzle array formed of nickel material is unrestrained and accommodated by the use of flexible combustion chamber walls and/or a floating frame concept, an undesirable deformation pattern is generated producing unacceptably high shear strains near the corners of the array resulting in low operating life of the nozzle array. This undesirable deformation pattern is typically due to the low shear stiffness of the nozzle array relative to the stiffness of its support structures and the inability to completely match the transient thermal response of the support structure to the nozzle array.

SUMMARY OF THE INVENTION

A primary object of the present invention is to minimize distortion and shear strain in rectangular structures.

In accordance with the present invention, a nozzle array for use in a chemical laser having a housing with rigid support walls includes a pair of flexible sidewalls adapted for accommodating spanwise thermal expansion of the nozzle array to provide relatively unrestrained thermal growth in the span direction, a plurality of nozzle manifolds extending between the flexible sidewalls in a spaced apart relationship with one another along the lengthwise dimension of the nozzle array, a multiplicity of relief slots extending between the sidewalls and disposed in a spaced apart relationship along the length of the array with each relief slot disposed between each nozzle manifold wherein the relief slots are adapted for absorbing lengthwise thermal expansion of the nozzle array; a pair of end walls adapted for cooperating with the sidewalls to enclose the nozzle manifolds therebetween, wherein the nozzle array is disposed between the rigid support walls of the housing in a spaced apart relationship thereto such that the array and the support walls cooperate for constraining lengthwise thermal expansion of the sidewalls such that corner strain in the nozzle manifolds is minimized; and a restoring bar fixedly attached to a top portion of each of the sidewalls adapted for elastic restoration of plastic compression of the nozzle array resulting from the rigid support wall constraining the thermal expansion of the array during operation of the laser.

A primary feature of the present invention is a bar of high strength material fixedly attached, as for example by brazing, to the top portion of a sidewall. In one embodiment the nozzle element, the sidewalls and the end walls are fabricated of pure nickel material for compatible operation with fluorine gas and the bar material is formed with INCO 718 material. Additionally the restoring bar is configured to have sufficient bending inertia to stretch the end walls to match the nozzle array spanwise growth. During operation of the nozzle, the high temperature gases flowing therethrough significantly increase the temperature of the nozzle elements with a resultant thermal expansion therein. The rigid support walls of the housing enclosing the nozzle array are adapted for inhibiting the thermal expansion of the sidewalls in the lengthwise direction. At the operating temperature of the nozzle, the nickel sidewalls and the relief slots undergo plastic deformation which, due to the support wall restraint, results in the sidewall undergoing plastic compression and the relief slots undergoing plastic bending. The relatively cool high strength restoring bar undergoes elastic deformation during operation. During cooling, the restoring bars are elastically restored to their original length while tensionally restoring the nozzle array to its original position resulting in substantially no permanent net distortions of the nozzle array. Additionally the relief slots within the nozzle elements are flexed during the thermal expansion to provide a load path other than shear transfer between the nozzle elements and no significant corner shear strain develops.

A primary advantage of the present invention is the minimization of both corner shear and nozzle array deflection with a corresponding increase in the lifetime of the nozzle array.

The foregoing and other objects, features and advantages of the present invention will become more apparent in the light of the following detailed description of preferred embodiments thereof as discussed and illustrated in the accompanying drawing.

BRIEF DESCRIPTION OF THE DRAWING

FIG. 1 is a top view of a nozzle configuration in accordance with the present invention;

FIG. 2 is a simplified cutaway perspective view of an end section of the nozzle configuration shown in FIG. 1;

FIG. 4 is a simplified cross-sectional view of the sidewall in the direction 4—4 as shown in FIG. 2;

DESCRIPTION OF THE PREFERRED EMBODIMENT

Figure 3:
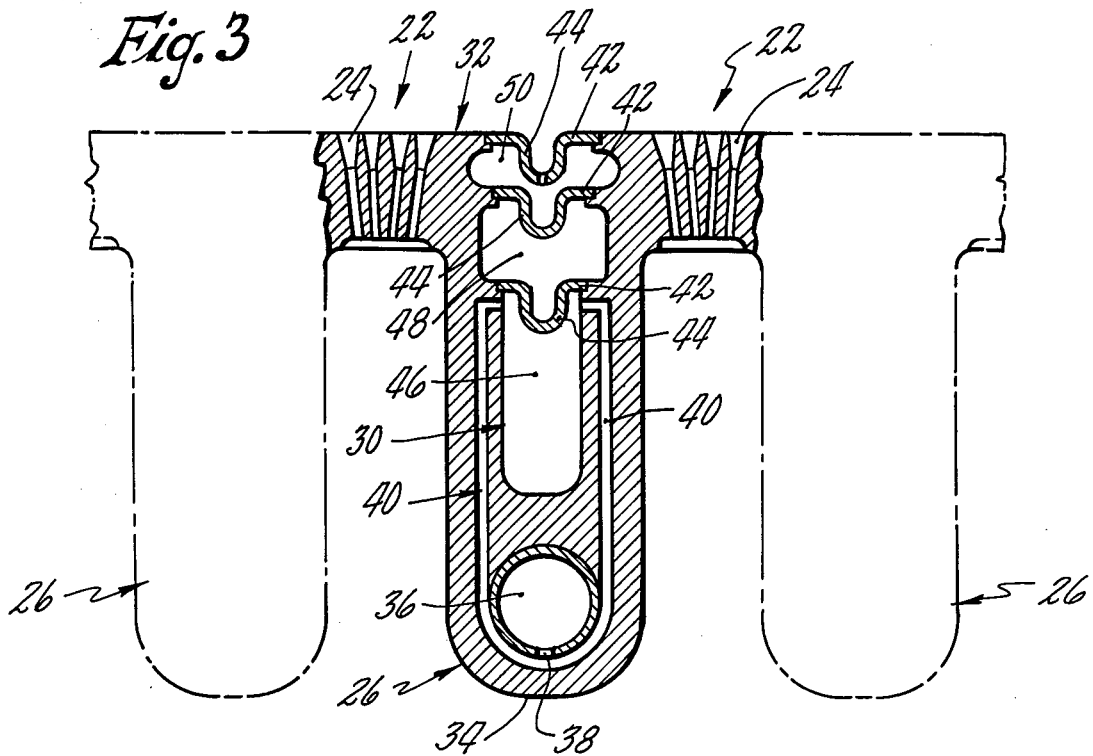
FIG. 3 is a cross-sectional view of a nozzle element in the direction 3—3 as shown in FIG. 2.

Referring now to FIG. 1 which shows a top view of a nozzle configuration in accordance with the present invention 10 disposed between rigid support walls 12 of a housing (not shown) of a chemical laser. The nozzle array includes sidewalls 14 disposed in a parallel relationship to one another, a restoring bar 16 fixedly attached, as by brazing, to the exterior surface of the sidewalls, end walls 18 disposed in a parallel relationship to one another and a spaced apart parallel realtionship to the support walls 12 to maintain a small gap 20 therebetween wherein the end walls are attached to the sidewalls forming a rectangular configuration, a plurality of nozzle manifolds 22 disposed spanwise between the sidewalls and fixedly attached thereto and repetitively positioned in a spaced apart relationship lengthwise along the nozzle array wherein each nozzle manifold includes a plurality of nozzle elements 24 adapted for injecting primary and secondary gas into a laser cavity (not shown) by means well known in the art, and a plurality of support beams 26 repetitively disposed between each of the nozzle manifolds along the length L of the nozzle array between the end walls 18 wherein said support beams are lengthwise attached to the nozzle manifolds forming an integral structure therewith.

Referring now to FIG. 2 which shows a simplified perspective view of an end section of the nozzle array as shown in FIG. 1 having a combustion chamber 28 adapted for providing reactant gases to the nozzle elements and a relief slot 30 located within each of the support beams 26 extending longitudinally between the sidewalls. The relief slots shown in greater detail in FIG. 3 are adapted for accommodating lengthwise thermal deformation of the nozzle array such that the effective length L of the nozzle array remains essentially constant during the operation of the laser.

Referring now to FIG. 3 which shows a simplified cross-sectional view of the support beams 26, the nozzle manifold 22 and the relief slots 30 in the direction 3—3 as shown in FIG. 2. The relief slots extend from a top surface 32 of nozzle array defining one boundary of an optical cavity (not shown) toward the bottom end 34 of the support beam. In the preferred embodiment the support beam is cooled by fluid means, such as nitrogen gas, flowing through a coolant distribution manifold 36 and passing through apertures 38 disposed along the length of the distribution manifold to coolant channels 40. The relief slots 30 are compartmentalized utilizing flexure plates 42 adapted for contracting and expanding as the support beam and nozzle manifolds thermally deform in either contraction or expansion during the operation of the laser. The flexure plates are typically formed of nickel sheets having an expansion section 44. The flexure plates allow the relief slots to compensate for thermal distortion and to provide a return manifold 46 for the coolant flow, a secondary manifold 48 adapted for providing a flow of secondary gas through the nozzle elements 24, and a bank purge manifold 50 adapted for providing purge gas into the optical cavity. The flow of coolant, secondary gas and purge gas through the relief slots provides coolant to the support beams without significantly affecting the primary function of the slots to compensate for lengthwise thermal distortions.

In operation, as hot gases such as fluorine pass from the combustion chamber 28 and are expanded through the nozzles 24, heat transfer from the hot gases to the nozzle array produces a significant temperature rise in the nozzle array with corresponding thermal deformation of the elements of the array. Lengthwise thermal expansion of the array is substantially compensated by the expansion of the individual nozzle manifolds with a corresponding contraction in the width of the relief slots 30 such that the net overall length of the nozzle array remains substantially unchanged during the thermal cycling of the laser. As the temperature increases, the sidewalls 14 also expand lengthwise forcing the end walls 18 against the support walls 12 such that the end walls maintain a substantially parallel relationship to the support walls. During the expansion the small gaps 20 which exist between the end walls and the support walls at ambient temperature are substantially eliminated. In the preferred embodiment the nozzle array is constructed with material, such as pure nickel, which is compatible with operation in an adverse environment of fluorine gas. In operation the laser is typically operated in a pulse mode resulting in the nozzle array being subjected to cyclic temperature excursions with the resulting thermal expansion and contraction. For a typical chemical laser the maximum operating temperature exceeds the temperature limits for elastic deformation of nickel and the material of the array deforms plastically with the net result being a net distortion of the array after each temperature cycle. The successive temperature cycling during operation results in failure of the nozzle array after a relatively short operating time. The sidewalls expand against the support walls as the operating temperature increases. The support walls restrain further expansion, as the temperature increases past the elastic limits resulting in the sidewalls being plastically compressed.

In accordance with the present invention the restoring bars 16 disposed near the top portion of the outside of the sidewalls 14 as shown in FIG. 2 are essentially shielded from the hot fluorine gas and typically operate at a temperature less than the temperature of the sidewalls such that the deformation characteristics of the restoring bar remain elastic. During the increasing temperature cycle of operation, the restoring bars expand with the sidewalls against the support walls 12. However, during the cooling cycle of operation the restoring bars elastically return to their ambient length and, as in a typical bimetal application, forces the sidewall material to which it is fixedly attached to deform in the general direction of the restoring bar deformation. Since the sidewalls 14 are plastically compressed during the portion of the cycle for which the nozzle array is at maximum temperature, the compressive restoration of the restoring bar results in a tensile force to the sidewall to restore the compressively deformed sidewall to its original shape. In the preferred embodiment, the restoring bar is formed of INCO 718 (by weight percent, 19

Cr, 18 Fe, 5.2 (Cb+Ta), 0.9 Ti, 0.6 Al, 0.1 C, balance Ni). It is to be recognized that the restoring bar may also function as a fluid supply manifold and may be cooled by fluid channels 52 as shown in FIG. 2.

Referring now to FIG. 4 which shows a simplified cross-sectional view of the sidewalls in the direction 4—4 as shown in FIG. 2. The sidewalls at ambient temperature are located at position A and as the temperature of the array reaches its maximum value during the operation cycle, the sidewalls flex to position B with a corresponding thermal expansion of the support beam 26. The restoring bar has sufficient bending inertia to deliver a load to essentially stretch the end walls 18 as shown in FIGS. 1 and 2 to match the nozzle array spanwise growth. This stretching of the end wall essentially protects the nozzle manifold located adjacent to the end wall against shear distortion during the deformation cycle.

Figure 5A:
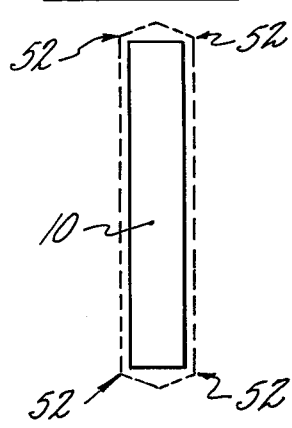
FIG. 5A is a simplified top view of the distortion distribution of a prior art nozzle array.
Figure 5B:
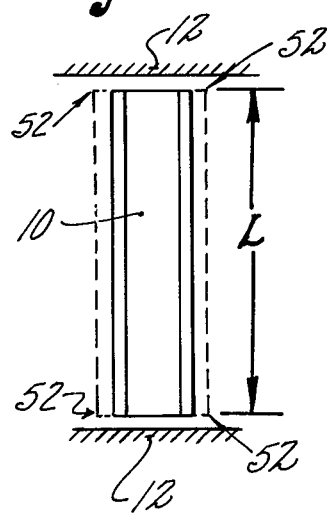
FIG. 5B is a simplified top view of the distortion distribution of a nozzle array incorporating the present invention.

Referring now to FIG. 5 wherein the rectangular nozzle array 10 shown as a simple rectangle is shown in its ambient and thermally deformed condition. This condition represents deformation for a simple shell restrained array. During operation the array expands from a first position A shown by the solid lines in FIG. 5A to a second position B as shown by the dotted lines. This deformation pattern reduces unacceptably high shear strains in the nozzle manifolds near the corners 52 of the array resulting in reduced nozzle array lifetimes. A nozzle array constructed in accordance with the present invention will have substantially no expansion in the lengthwise direction L as shown in FIG. 5B as a result of the compression of the relief slots 30 as shown in FIGS. 1 and 3 and will have a spanwise deformation as shown by the dotted lines in FIG. 5B with no significant corner shear strain resulting at the corners 52.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. In a chemical laser having a housing with rigid support walls, a nozzle array disposed between the rigid support walls comprising:

a pair of flexible sidewalls for accommodating spanwise thermal expansion of the nozzle array to provide relatively unrestrained thermal growth in the spanwise direction;

a plurality of nozzle manifolds extending between the flexible sidewalls wherein each of said nozzle manifolds is disposed in a spaced apart relationship with one another along the lengthwise dimension of the nozzle array;

a plurality of support beams extending between the flexible sidewalls and fixedly attached at each end thereto, wherein each of said support beams is sequentially positioned between the nozzle manifolds;

a relief slot disposed lengthwise between the flexible sidewalls within each of said support beams for absorbing lengthwise thermal expansion of the nozzle array;

a pair of end walls each disposed between the pair of flexible sidewalls wherein the end walls and the sidewalls enclose the nozzle manifolds therebetween and said end walls are disposed proximate the support walls of the housing in a spaced apart relationship thereto at ambient temperature; and a restoring bar fixedly attached to a top portion of each of the flexible sidewalls for providing lengthwise elastic restoration of plastic thermal compression of the nozzle array during the operation of the laser and for accumulating, transferring and delivering a load required to stretch the end wall for spanwise thermal expansion compatibility.

2. The invention in accordance with claim 1 wherein the nozzle manifold, sidewalls, and end walls are formed with material compatible for use in a chemical laser employing fluorine.

3. The invention in accordance with claim 2 wherein the material compatible with operation with fluorine is pure nickel.

4. The invention in accordance with claim 3 wherein the restoring bar is formed with INCO 718 (by weight percent, 19 Cr, 18 Fe, 5.2 (Cb+Ta), 0.9 Ti, 0.6 Al, 0.1 C, balance Ni) material.

5. The invention in accordance with claim 1 wherein the relief slots are compartmentalized by flexure plates spanning the width of the relief slots.

6. The invention in accordance with claim 5 wherein the compartmentalized relief slots include:

a return manifold for coolant flow through the nozzle support beams;

a secondary manifold for providing a flow of secondary gas through nozzle elements within the nozzle manifolds; and a bank purge manifold for providing a flow of purge gas into an optical cavity of said laser.

* * * * *